March 30, 1937. C. R. BROWNELL 2,075,777
TIRE CARCASS CORD AND MANUFACTURE OF SAME
Filed June 26, 1933

Inventor:
Carl R. Brownell
By Geo. H. Kennedy Jr.
Attorney

Patented Mar. 30, 1937

2,075,777

UNITED STATES PATENT OFFICE 2,075,777

TIRE CARCASS CORD AND MANUFACTURE OF SAME

Carl R. Brownell, Worcester, Mass., assignor to Worcester Tire Fabric Company, Worcester, Mass., a corporation of Massachusetts Application June 26, 1933, Serial No. 677,616

3 Claims. (Cl. 117—52)

The present application is a continuation, in part, of my copending application Serial No. 652,710 filed January 20, 1933, and the invention relates to the carcass construction of "cord" tires,—i. e., tires in which a multiplicity of layers of twisted cords embedded in the rubber of the casing are used instead of woven textile fabric layers in the construction of the casing carcass.

In the ordinary tire carcass cord, as supplied for use in tire manufacture, either in single end cones, or in "cord fabric" form, each cord concones sists of two or more strands, each strand being constituted by a plurality of single yarns. Each strand is formed by twisting the several yarns together in the same direction as that in which the individual yarns are spun, and the formation of two or more of these strands into a cord involves the twisting of the same together in the opposite direction. In the resulting cord structure, there is always a relatively high stretch capacity,—this resulting from so much twist being imparted to the cord for the purpose, primarily, of letting it flex or hinge with greater ease. Indeed, it has even been the approved practice, as shown by Steere Patent No. 1,632,201 dated June 14, 1927 to considerably increase the twist factors in the manufacture of tire carcass cords, thus materially augmenting their capacity for stretch or elongation,—and this notwithstanding the sacrifice that such extra twisting entails in the tensile strength of the cord.

One of the bad results that flows from the use of highly twisted carcass cords of relatively high stretch capacity is the common tendency of the tire casing, after use for a short time, to swell or "grow",—this involving nearly always such a change in the normal and intended contour or shape of the section of the tire or casing that the latter may no longer possess the characteristics relating to traction, steering, wear-resistance, and other factors that were contemplated by its original design. Furthermore, a cord of relatively high stretch capacity, in order to possess the requisite tensile strength, must be of relatively large diameter or gage. Consequently, in the manufacture of tires with a considerable number of layers or plies of cords, the carcass inevitably is always disproportionately heavy and thick and thus more susceptible than otherwise to excessive heating and internal friction.

My invention overcomes in large measure the above described and other difficulties encountered in the use of highly twisted carcass cords in tire casings, which difficulties have their origin in the reduced tensile strength, increased gage and increased stretch capacity of such highly twisted cord, as heretofore utilized. Briefly stated, the present invention contemplates the production of a multiple strand cord structure possessing not only the advantages resulting from the use of extra twist, such as the aforementioned hinging action in the tire casing, but also additional advantages not heretofore obtained and arising directly from increased tensile strength, decreased gage and decreased stretch capacity obtainable only in cord produced by the practice of my invention. The above described advantageous results are obtained by imparting to the multiple strand cord, either in connection with the twisting operation, or as a separate subsequent operation, or both, a permanent stretch or elongation. This stretch, however, is well within and short of the cord's limit of stretch or elongation and, in effect, is of such degree as to produce a cord which at the time of its incorporation in a tire has the same, or substantially the same, ability to stretch or elongate as has the ordinary cord taken from a tire after the latter has undergone the flexures and load stresses of prolonged use.

This stretching or elongation may be secured, according to my invention, by incorporating in the twisting machine, or by utilizing as a separate apparatus the cord stretching and setting instrumentalities shown diagrammatically, for illustrative purposes only, in the accompanying drawing, in which:—

Like reference characters refer to like parts in the different figures.

Figure 1:
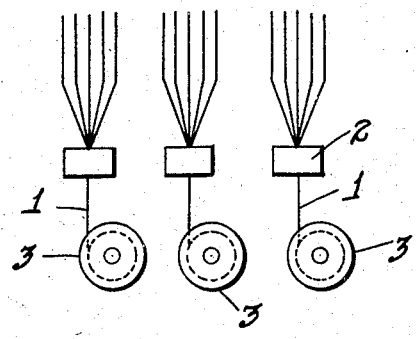
Fig. 1 is a diagrammatic view illustrating one way of stretching the cord while twisting the same.

Referring first to Fig. 1, a number of groups of single yarns are shown as being formed into individual strands 1 by their passage through ordinary ring twisters 2, the twisted strands 1 being wound on suitable packages 3. In the operation of the ring twisters 2, an extra twist is imparted to the yarns, as compared to the twist that would be usually imparted to such yarns in making tire carcass cord for ordinary purposes. A number of such packages 3 of twisted strands 1 are rotatably mounted with relation to a twisting machine, shown as comprising a rotatably driven flier 4, the strands passing through the hollow shaft of the flier to a pair of grooved stretching drums 5 carried by the flier. The drums 5 are rotatably driven simultaneously with the rotation of the flier itself, so that the several strands 1 are twisted into a cord 1a as they are drawn onto the drums, which cord is wound upon a spool 6 by an arm 7 rotatable with the flier.

In passing from the packages 3 to the flier, the several strands 1 are subjected to stretching by their passage through a tension device 8, here shown for purposes of illustration as consisting of a cup shaped ring, through the walls of which the strands pass with an annular weight 9 bearing on the strands as they are drawn across the bottom of the ring. Therefore, as the strands are twisted into the cord by the rotation of the flier 4, they are stretched, the degree of stretch being controlled by the amount of frictional retardation due to the pressure of the weight 9. Furthermore, as the twisted cord passes around the drums 5 on its way to the spool 6, the cord is further stretched by reason of the fact that the grooves of the drums 5 are of gradually increasing diameter, the cord being stretched progressively. In carrying out the invention, the speed of the flier relative to the travel of the strands therethrough is such as to impart an extra high twist to the cord, while the drag of the weight 9 and the pull exerted by the drums 5 are such that the completed cord has a definite permanent stretch or elongation imparted thereto, although the amount of stretch is well within its elastic limit. This stretch is preserved in the cord without appreciable loss as it is wound upon the spool 6, the cord being maintained thereon in its stretched condition until it becomes permanently and definitely "set" in that condition.

In the formation of carcass cord in the manner described above, the extra twists imparted to the yarns and to the cord are of such degree as to produce a highly twisted cord, as substantially defined in the aforementioned Steere Patent, No. 1,632,201. In the completed cord, the amount of stretch is such that the cord exhibits an elongation very much less than that exhibited by highly twisted cord heretofore produced in accordance with the teachings of Steere. The degree of stretching at the time of twisting, as described above, is such as to produce a cord which at the time of its incorporation in a tire has the same, or substantially the same, ability to stretch or elongate as has ordinarily twisted cord taken from a tire after the latter has undergone the flexures and load stresses of prolonged use. Furthermore, as a result of such stretching at the time of twisting, it has been found that cord made as described above, will gauge less than ordinary cord having a lower twist and higher elongation than specified above.

Figure 2:
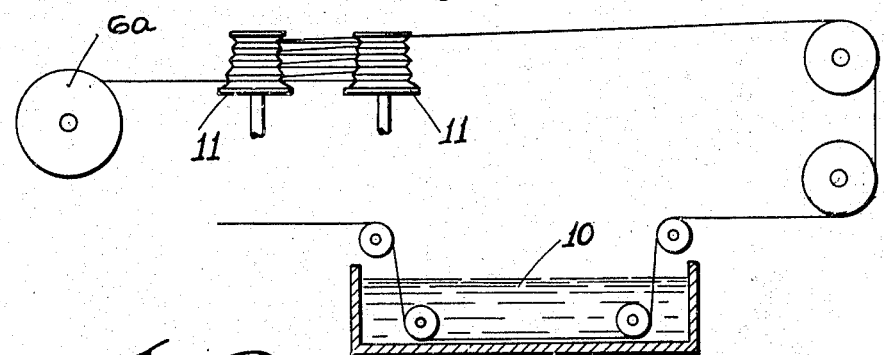
Fig. 2 is a diagrammatic view illustrating one way of stretching the cord, as a separate operation, after twisting the same.

When it is desired to produce a cord having a still higher tensile strength with less stretch capacity than the cord produced as described above, the invention contemplates further treatment of the cord in the manner indicated diagrammatically in Fig. 2. In this arrangement, the highly twisted cord is led through a sizing, or other suitable bath as indicated at 10, on its way to a pair of stretching drums 11 with grooves of gradually increasing diameter, from which the cord is wound on a spool 6a. It has been found that passage through the bath 10 facilitates further stretching of the cord by the drums 11, the drying of the so treated and stretched cord serving to hold or set therein the imparted attenuation which as previously stated, is nevertheless of such extent as to always leave in the cord a further capacity for stretching or elongation of a degree substantially the same as that possessed by ordinary cords after the tire in which they are incorporated has been in long use. With cord that has been subjected to such extra twisting as described above, it has been found that such cord will exhibit an elongation even less than that exhibited by the cord made in accordance with the disclosure of Fig. 1.

Figure 3:
Fig. 3 is a sectional view of a tire casing utilizing a cord fabric carcass embodying the invention.

From the foregoing, it is apparent that the practice of my invention produces a highly twisted stretched cord of high tensile strength and low stretch capacity in which there is practically the maximum of flexibility or hinge action due to the extra twist. Such cord may be employed in the usual and ordinary way for tire carcass construction, as indicated in Fig. 3, either in single end cones or in "cord fabric" form. Its use, on account of the appreciable reduction and limitation of stretch capacity, completely overcomes, for all practical purposes, the tendency of the tire or casing when put into use to swell or "grow", and thus to lose its intended shape or contour. Of even greater advantage is the increase in tensile strength of the cord construction, from which the needless and excessive degree of stretch capacity has been eliminated. On account of the greater tensile strength, the same carcass strength as that obtained with ordinary cords of relatively high stretch capacity can be obtained with lighter and smaller cord layers, thereby materially reducing the cost of the materials used in cord or balloon tire construction. Furthermore, this use of lighter and smaller cord layers, without sacrifice of strength, gives opportunity for appreciable lightening of the tire walls with a corresponding reduction of the heat produced in said walls by internal friction.

I claim:

1. As a new article of manufacture, a tire carcass cord having an extra degree of twist as compared to ordinarily twisted carcass cord to increase its flexibility, said cord at the time of twisting the yarns and strands comprising the same having had its stretch capacity materially reduced to overcome the reduction of tensile strength produced by said extra twist.

2. In the manufacture of cord, the improvement which consists in producing in individual strands of the cord an extra degree of twist, as compared to ordinarily twisted cord, at the time of forming the strands, followed by stretching of both the strands and of the cord itself immediately before and after the formation of the strands into a cord said stretching being sufficient to overcome the reduction of tensile strength produced by such extra degree of twist.

3. In the manufacture of tire carcass cord, the improvement which consists in producing in individual yarns a substantially higher twist than that usually incorporated in yarns for carcass cord at the time of forming the yarns into a strand, stretching said strands prior to their formation into a cord with a substantially higher degree of twist than that usually incorporated in carcass cord followed by further stretching of the cord as it is wound upon a carrier, the highly twisted cord being maintained in its stretched condition until it becomes permanently set.

CARL R. BROWNELL.